United States Patent
Choi

(10) Patent No.: US 10,690,049 B2
(45) Date of Patent: Jun. 23, 2020

(54) VARIABLE COMPRESSION RATIO DEVICE

(71) Applicants: Hyundai Motor Company, Seoul (KR); KIA Motors Corporation, Seoul (KR)

(72) Inventor: Myung-Sik Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/413,689

(22) Filed: May 16, 2019

(65) Prior Publication Data
US 2020/0116080 A1  Apr. 16, 2020

(30) Foreign Application Priority Data
Oct. 16, 2018  (KR) .................. 10-2018-0123321

(51) Int. Cl.
| F02D 15/00 | (2006.01) |
| F02B 75/04 | (2006.01) |
| F16C 7/06 | (2006.01) |
| F15B 15/06 | (2006.01) |
| F16H 53/02 | (2006.01) |
| F15B 15/12 | (2006.01) |

(52) U.S. Cl.
CPC ............ *F02B 75/045* (2013.01); *F15B 15/06* (2013.01); *F15B 15/12* (2013.01); *F16C 7/06* (2013.01); *F16H 53/02* (2013.01)

(58) Field of Classification Search
CPC ........ F02D 15/00; F02B 75/045; F02B 75/04; F16C 7/06; F16C 9/04
See application file for complete search history.

(56) References Cited

U.S. PATENT DOCUMENTS

| 7,469,663 B1 * | 12/2008 | Berger | F02B 75/045 |
| | | | 123/48 B |
| 2002/0050252 A1 * | 5/2002 | Moteki | F02B 75/045 |
| | | | 123/48 B |
| 2009/0107466 A1 * | 4/2009 | Berger | F02B 75/045 |
| | | | 123/48 B |
| 2009/0107467 A1 * | 4/2009 | Berger | F02D 15/04 |
| | | | 123/48 B |
| 2014/0116395 A1 * | 5/2014 | Blackstock | F02B 75/04 |
| | | | 123/48 R |

FOREIGN PATENT DOCUMENTS

JP     H0299729 A     4/1990

* cited by examiner

Primary Examiner — Long T Tran
(74) Attorney, Agent, or Firm — Brinks Gilson & Lione

(57) ABSTRACT

A variable compression ratio device may include a connecting rod having a large end portion link-connected to a crankshaft and a small end portion link-connected to a piston by a piston pin, an eccentric cam rotatably installed at the small end portion of the connecting rod and at which the piston pin eccentrically passes through a rotation center, and an low-pressure outer plate and an high-pressure outer plate engaged with both side surfaces of the eccentric cam, formed to partially protrude outward, and selectively engaged with the connecting rod according to a compression ratio. In addition, the low-pressure outer plate and the high-pressure outer plate are selectively engaged with the connecting rod by a controller according to a supply direction of a hydraulic pressure.

20 Claims, 22 Drawing Sheets

VARIABLE COMPRESSION RATIO DEVICE

CROSS-REFERENCE TO RELATED APPLICATIONS

This application claims priority to and the benefit of Korean Patent Application No. 10-2018-0123321, filed on Oct. 16, 2018, which is incorporated herein by reference in its entirety.

FIELD

The present disclosure relates to a variable compression ratio device for a vehicle having a piston pin connecting a connecting rod and a piston.

BACKGROUND

The statements in this section merely provide background information related to the present disclosure and may not constitute prior art.

A piston installed at each of cylinders of an engine reciprocates between a predetermined top dead point and a bottom dead point to compress air or a mixture introduced into each of the cylinders.

Conventionally, in the engine, a crankshaft, the connecting rod, and the piston are formed in predetermined shapes and are connected to one another at fixed positions, so that they have a fixed compression ratio. Since the compression ratio is fixed, an output of the engine is inevitably controlled by air and fuel.

There is provided a variable compression device for varying a compression ratio by varying positions of upper and lower limits of the piston in each of the cylinders.

As an example of the variable compression device, an angle of an eccentric cam installed at a portion at which a connecting rod and a piston are connected is varied using a hydraulic pressure such a position of the piston is varied and thus a compression ratio is varied.

However, we have discovered that in the variable compression apparatus according to a related art, as oil is compressed by a force applied to the piston, a volume of an oil chamber for storing the oil is changed and thus a position of the piston is varied such that a predetermined compression ratio cannot be maintained.

The above information disclosed in this Background section is only for enhancement of understanding of the background of the present disclosure, and therefore it may contain information that does not form the prior art that is already known to a person of ordinary skill in the art.

SUMMARY

The present disclosure is directed to a variable compression ratio device capable of inhibiting oil from being compressed by a force applied to a piston and easily varying a compression ratio by a hydraulic pressure.

In accordance with an form of the present disclosure, a variable compression ratio device includes a connecting rod having a large end portion link-connected to a crankshaft and a small end portion link-connected to a piston by a piston pin, an eccentric cam rotatably installed at the small end portion of the connecting rod and at which the piston pin eccentrically passes through a rotation center, and an low-pressure outer plate and an high-pressure outer plate engaged with both side surfaces of the eccentric cam, formed to partially protrude outward, and selectively engaged with the connecting rod according to a compression ratio. In addition, the low-pressure outer plate and the high-pressure outer plate are selectively engaged with the connecting rod by a controller according to a supply direction of a hydraulic pressure.

The low-pressure outer plate and the high-pressure outer plate may be formed to partially protrude outward at the same phase. When the compression ratio is a low compression ratio, the low-pressure outer plate may be engaged with the connecting rod to direct the protruding portion to face downward, and when the compression ratio is a high compression ratio, the high-pressure outer plate may be engaged with the connecting rod to direct the protruding portion to face upward.

A first oil line to which oil is supplied when the low-pressure outer plate and the connecting rod are engaged, and a second oil line to which the oil is supplied when the high-pressure outer plate and the connecting rod are engaged may be formed at the connecting rod.

A latch pin may be installed at the connecting rod to be slidable in a direction perpendicular to the connecting rod, and when the oil is supplied to the first oil line so as to switch a high compression ratio to a low compression ratio in a cylinder, the eccentric cam may be engaged with the high-pressure outer plate by the latch pin, and when the oil is supplied to the second oil line so as to switch the low compression ratio to the high compression ratio in the cylinder, the eccentric cam may be engaged with the low-pressure outer plate by the latch pin.

A first latch groove may be formed at the low-pressure outer plate to accommodate the latch pin, and when the oil supplied from the first oil line fills in the first latch groove, the latch pin may be is moved from the first latch groove to the connecting rod such that a state of the low compression ratio is released. An inlet hole through which the oil supplied from the first oil line flows into the first latch groove, and a discharge hole through which the oil is discharged from the first latch groove may be formed at the first latch groove.

A second latch groove may be formed at the high-pressure outer plate to accommodate the latch pin, and when the oil supplied from the second oil line fills in the second latch groove, the latch pin may be moved from the second latch groove to the connecting rod such that a state of the high compression ratio state is released. An inlet hole through which the oil supplied from the first oil line flows into the second latch groove, and a discharge hole through which the oil is discharged from the second latch groove may be formed at the second latch groove.

An oil chamber may be formed at a circumference of the eccentric cam to accommodate the oil supplied from the first oil line, and when the oil is supplied from the first oil line to the oil chamber, the eccentric cam may be rotated to switch a state of a low compression ratio to a state of a high compression ratio. A separation wall may be formed at the connecting rod to separate the oil chamber into two spaces.

An auxiliary chamber communicating with the oil chamber may be is formed at a front end of the oil chamber to allow a rotation of the eccentric cam to start when the oil is supplied from the first oil line. A drain line may be formed at the connecting rod to communicate a side, at which the auxiliary chamber is not formed, with the outside about the separation wall at the oil chamber.

The variable compression ratio device may further include an oil control valve controlled by the controller and configured to supply pressurized oil to either the first oil line or the second oil line.

In accordance with a further aspect of the present disclosure, the connecting rod may include a spool valve configured to discharge the oil filled in the oil chamber to the outside when the state of the high compression ratio is switched to the state of the low compression ratio. The spool valve may include a valve body formed in a cylindrical shape having one closed end and fixed to the connecting rod, and a plunger slidably installed inside the valve body and configured to communicate the first oil line with the outside while sliding when the state of the high compression ratio is switched to the state of the low compression ratio.

The first oil line and the second oil line may be formed to pass through a circumference of the spool valve, and a first groove and a second groove may be formed with a predetermined depth at positions at which the first oil line and the second oil line pass through a circumference of the valve body.

A pressure release hole through which the oil supplied to the second oil line flows into the valve body may be formed at the second groove, and a pressure release groove communicating with the pressure release hole and having a predetermined depth toward the closed end of the valve body may be formed at an outer side of the plunger to slide the plunger by supplying the oil to the closed end of the valve body.

An oil discharge hole may be formed at the first groove to allow the oil filled in the first oil line to flow into the valve body, an oil discharge passage may be formed at the plunger in a length direction of the plunger and may have one end configured to allow the plunger to slide and communicate with the oil discharge hole and the other end through which the oil flowing into the oil discharge hole is discharged, and a valve discharge hole may be formed at a position adjacent to the other end of the valve body and may discharge the oil flowing into the oil discharge hole to the outside of the spool valve.

A cap configured to block an end portion of the valve body may be engaged with the opened end portion of the valve body, and an elastic member configured to elastically support the plunger inward the valve body may be installed between the cap and the plunger. A through-hole may be formed at the cap to discharge the oil inside the plunger to the outside.

A rotation prevention pin may be inserted between an inner surface of the valve body and an outer surface of the plunger to inhibit or prevent a rotation of the plunger.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
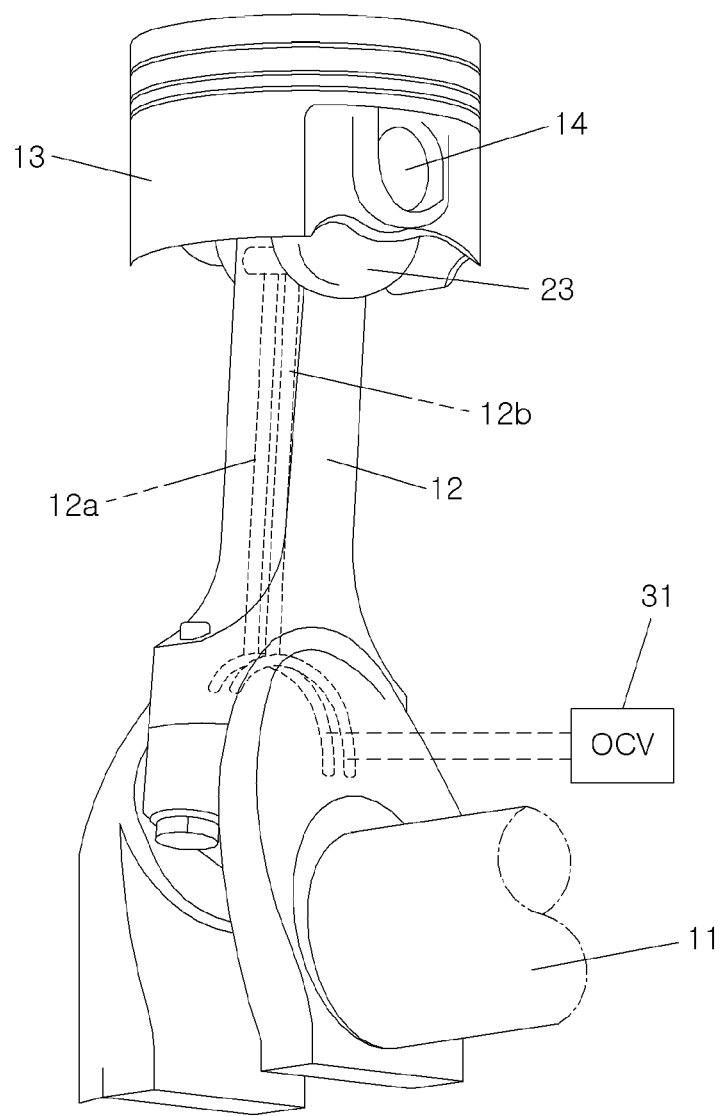
FIG. 1 is a perspective view illustrating a variable compression ratio device according to an exemplary form of the present disclosure.

FIGS. 11 to 17 are diagrams illustrating a state in which the variable compression ratio device according to the exemplary form of the present disclosure operates in a case in which a low compression ratio is switched to a high compression ratio; and FIGS. 18 to 22 are diagrams illustrating a state in which the variable compression ratio device according to the exemplary form of the present disclosure operates in a case in which the high compression ratio is switched to the low compression ratio.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
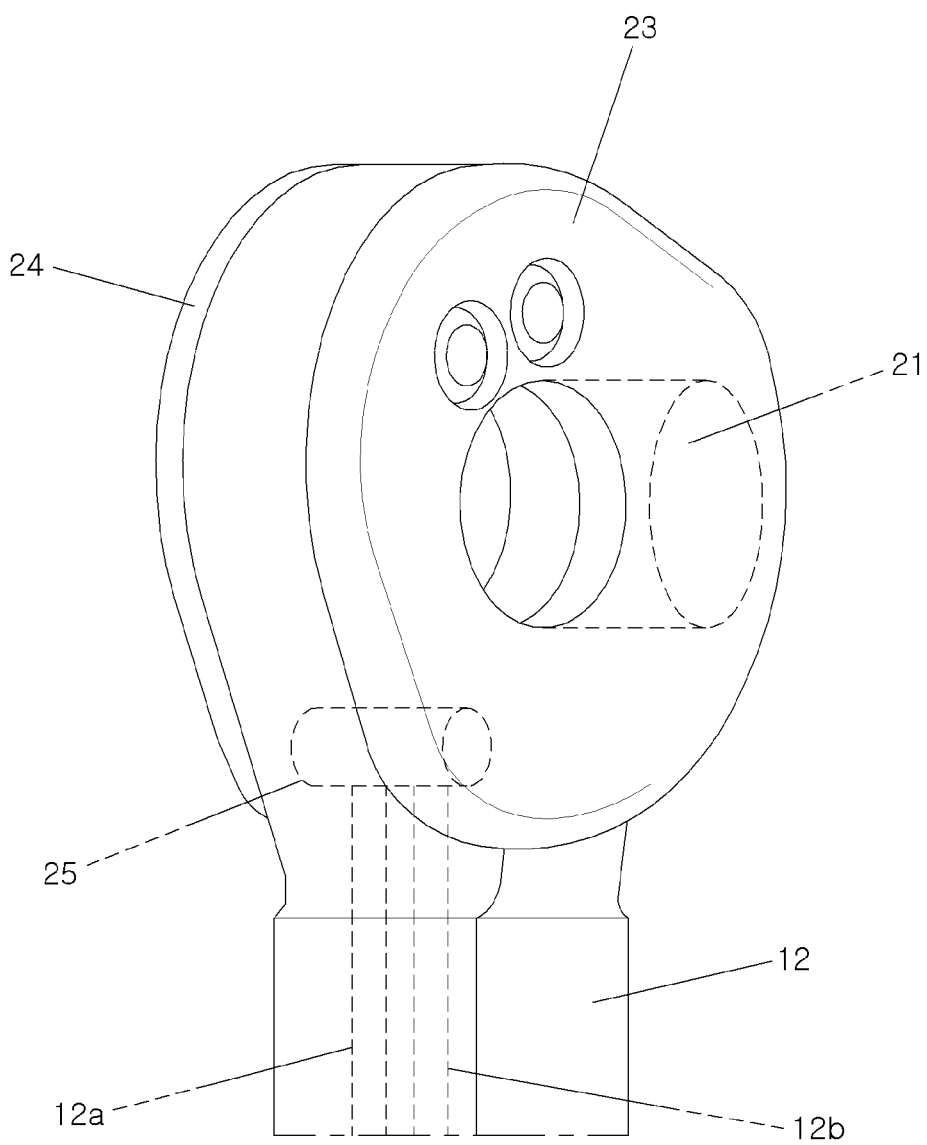
FIG. 2 is a perspective view illustrating a small end portion of a connecting rod in the variable compression ratio device according to the exemplary form of the present disclosure.

Referring to FIGS. 1 and 2, the variable compression ratio device according to a form of the present disclosure includes a connecting rod 12 having a large end portion link-connected a crankshaft 11 and a small end portion link-connected a piston 13 by a piston pin 14, an eccentric cam 21 which is rotatably installed at the small end portion of the connecting rod 12 and at which the piston pin 14 passes eccentrically through from a rotation center, and an low-pressure outer plate 23 and an high-pressure outer plate 24 engaged with both side surfaces of the eccentric cam 21, formed to partially protruding outward, and selectively engaged with the connecting rod 12 according to a compression ratio. The low-pressure outer plate 23 and the high-pressure outer plate 24 are selectively engaged with the connecting rod 12 by a controller according to a supply direction of a hydraulic pressure.

As shown in FIG. 1, the large end portion of the connecting rod 12 is connected to the crankshaft 11 and the small end portion thereof is connected to the piston 13. A first oil line 12a and a second oil line 12b are formed at the connecting rod 12 in a length direction of the connecting rod 12. A lower end of each of the first oil line 12a and the second oil line 12b is connected to an oil control valve (OCV) 31, and an upper end of each thereof is connected to the small end portion of the connecting rod 12. The first oil line 12a and the second oil line 12b receive pressurized oil supplied from the oil control valve 31. When a compression ratio of the pressurized oil is varied, the oil control valve 31 supplies the pressurized oil to either the first oil line 12a or the second oil line 12b. For example, when the compression ratio is increased (when a low compression ratio is switched to a high compression ratio), the oil control valve 31 supplies oil to the first oil line 12a, and when the compression ratio is decreased (the high compression ratio is switched to the low compression ratio) the oil control valve 31 supplies the oil to the second oil line 12b. A drain line 12c is formed at one side of the small end portion of the connecting rod 12 to drain oil from the small end portion (See FIG. 3).

The piston 13 is connected to the small end portion of the connecting rod 12 by the piston pin 14.

Figure 3:
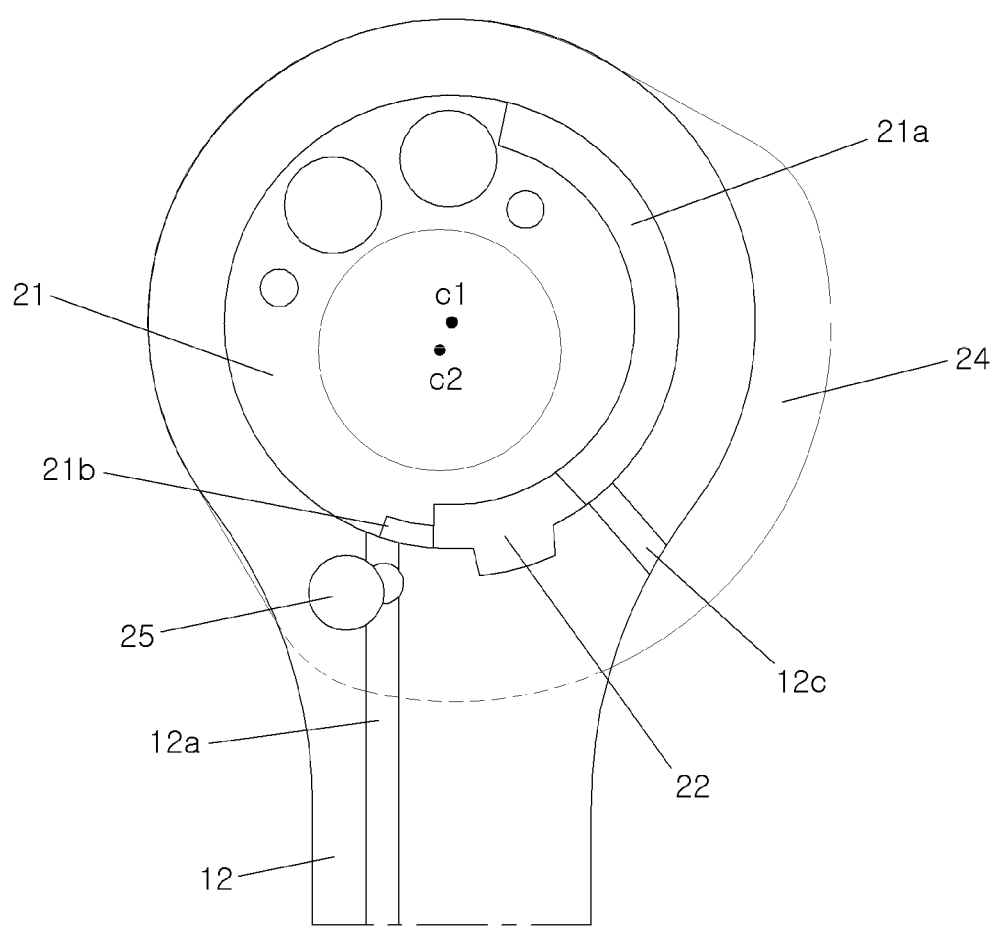
FIG. 3 is a front view illustrating the small end portion of the connecting rod in the variable compression ratio device according to the exemplary form of the present disclosure.

In FIGS. 1 through 3, the piston 13 is connected to the small end portion of the connecting rod 12 through the eccentric cam 21 instead of being directly connected to the small end portion thereof. That is, the piston pin 14 passes through the piston 13 and the small end portion of the connecting rod 12, and in a state in which the eccentric cam 21 is fitted into the small end portion of the connecting rod 12, the piston pin 14 passes through the eccentric cam 21. Accordingly, a center c1 of the small end portion of the connecting rod 12 and a center c2 of the piston pin 14 become eccentric such that the compression ratio may be varied.

A circumference of the eccentric cam 21 is formed in a circular shape to be rotatably installed at the small end portion of the connecting rod 12. A through-hole is formed inside the eccentric cam 21 to allow the piston pin 14 to pass the eccentric cam 21. A center of the through-hole is eccentric with a center of the eccentric cam 21 such that the compression ratio may be varied according to a position of the eccentric cam 21. An oil chamber 21a is formed at the circumference of the eccentric cam 21 to accommodate oil.

Figure 5:
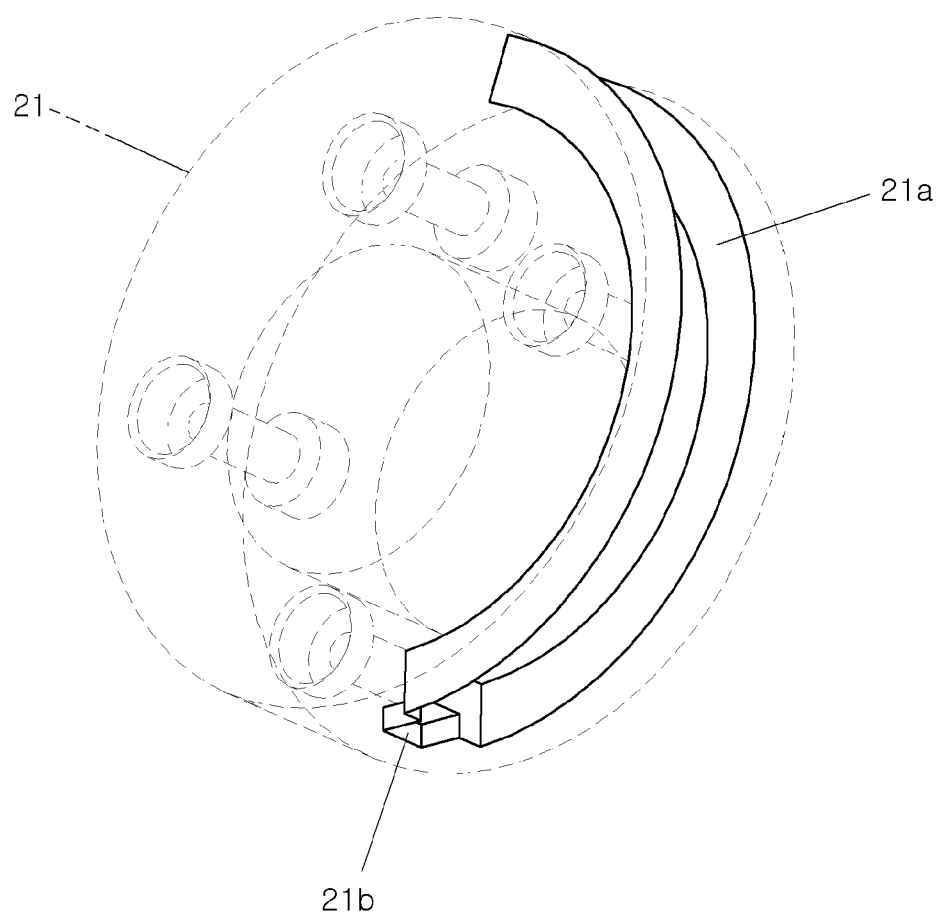
FIG. 5 is a perspective view illustrating an oil chamber of an eccentric cam in the variable compression ratio device according to the exemplary form of the present disclosure.
Figure 6:
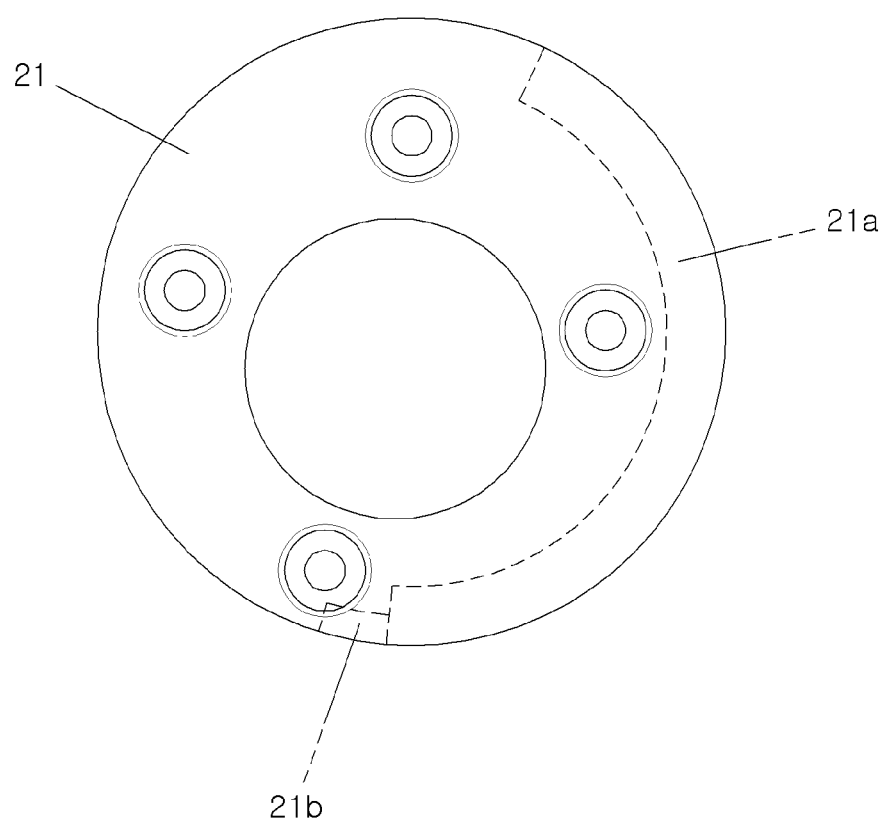
FIG. 6 is a front view illustrating the eccentric cam in the variable compression ratio device according to the exemplary form of the present disclosure.

As shown in FIGS. 5 and 6, the oil chamber 21a is formed with a predetermined depth at an outer circumference of the eccentric cam 21. Further, the oil chamber 21a is formed with a predetermined length in a circumferential direction of the eccentric cam 21. An auxiliary chamber 21b for rotating the eccentric cam 21 at an initial stage is formed at one side of the oil chamber 21a, i.e., at a front end of the eccentric cam 21 when the eccentric cam 21 rotates in a direction to increase the compression ratio. The auxiliary chamber 21b and the oil chamber 21a communicate with each other. When a low compression ratio is switched to a high compression ratio, the auxiliary chamber 21b is used as a space in which initially pressurized oil is supplied.

As shown in FIG. 3, a separation wall 22 for separating the oil chamber 21a into two spaces is disposed inside the oil chamber 21a. The separation wall 22 is fixedly installed at the small end portion of the connecting rod 12 to separate the oil chamber 21a into two spaces and supplies the pressurized oil to one space (a space communicating with the auxiliary chamber 21b) and allows the supplied oil to be discharged through the other space, thereby rotating the eccentric cam 21.

Referring back to FIG. 2, the outer plates 23 and 24 are respectively engaged with both sides of the eccentric cam 21. Each of the outer plates 23 and 24 is rotated together with the eccentric cam 21 and is selectively fixed to the connecting rod 12, thereby varying the compression ratio.

The low-pressure outer plate 23 is fixed to the connecting rod 12 in a state of a low compression ratio, and the high-pressure outer plate 24 is fixed to the connecting rod 12 in a state of a high compression ratio.

As shown in FIG. 2, overall shapes of the low-pressure outer plate 23 and the high-pressure outer plate 24 are symmetrically formed. The low-pressure outer plate 23 and the high-pressure outer plate 24 are engaged with the eccentric cam 21 by engagement parts such as engagement bolts, engagement nuts, and the like. The through-hole of the eccentric cam 21 and through-holes of the low-pressure outer plate 23 and the high-pressure outer plate 24 are formed with at the same position such that the eccentric cam 21, the low-pressure outer plate 23, and the high-pressure outer plate 24 are integrally engaged using engagement bolts and engagement nuts.

Figure 7:
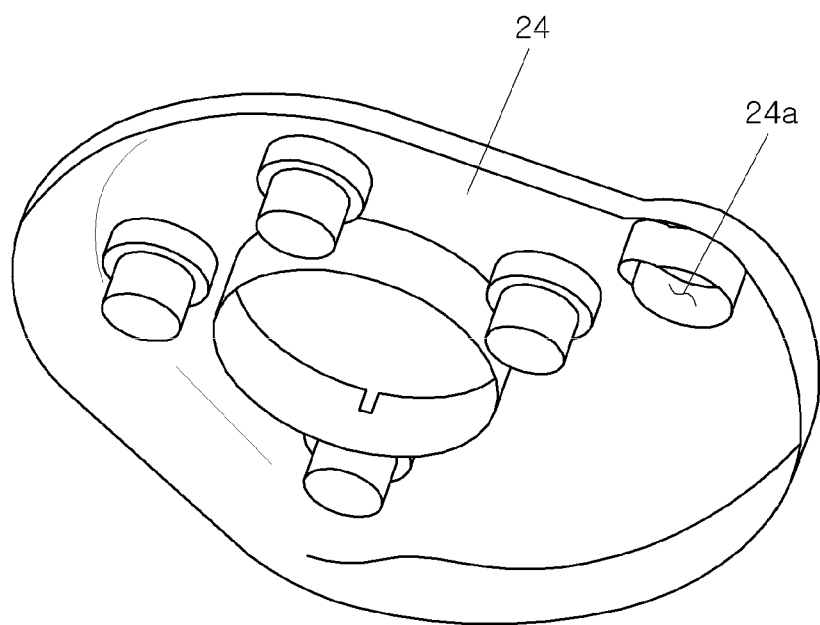
FIG. 7 is a perspective view illustrating a high-pressure outer plate in the variable compression ratio device according to the exemplary form of the present disclosure.
Figure 8:
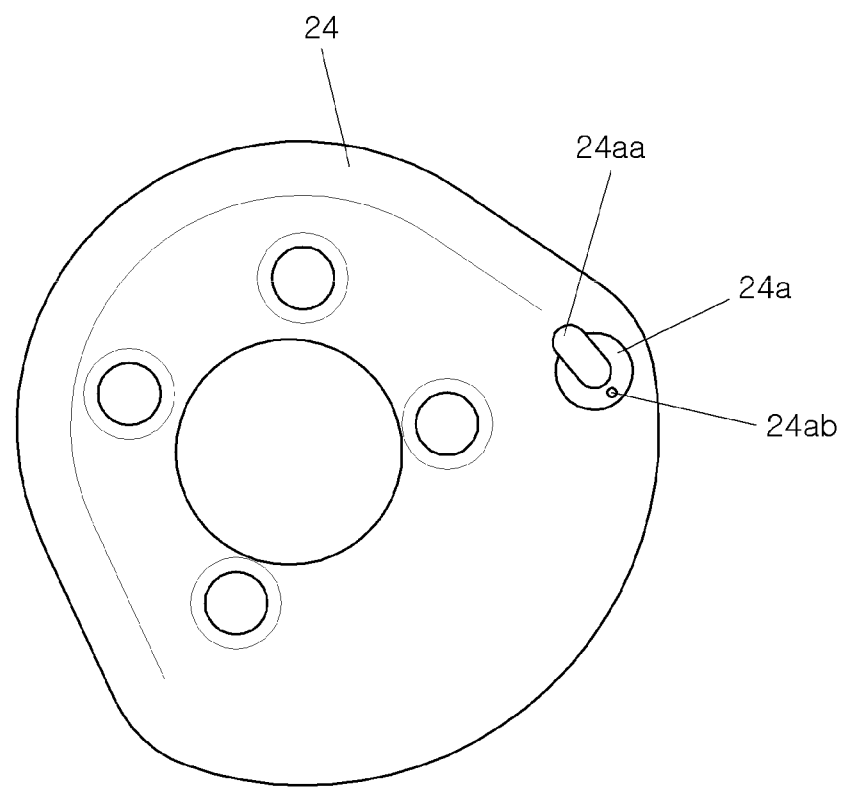
FIG. 8 is a front view illustrating the high-pressure outer plate in the variable compression ratio device according to the exemplary form of the present disclosure.
Figure 9:
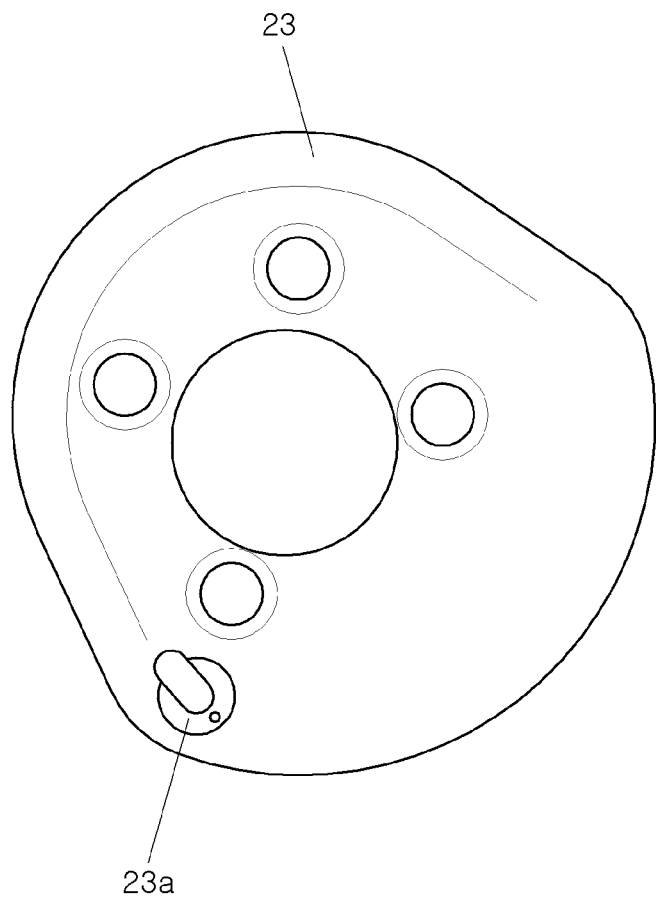
FIG. 9 is a perspective view illustrating a low-pressure outer plate in the variable compression ratio device according to the exemplary form of the present disclosure.

In a state of a high compression ratio, the low-pressure outer plate 23 and the high-pressure outer plate 24 are formed such that one side of each of the low-pressure outer plate 23 and the high-pressure outer plate 24 has a larger radius than the other side of each thereof to increase a height of the piston 13. That is, a lower right portion of the low-pressure outer plate 23 has a larger radius as shown in FIG. 9, and a lower right portion of the high-pressure outer plate 24 has a larger radius as shown in FIGS. 7 and 8. When a portion of each of the low-pressure outer plate 23 and the high-pressure outer plate 24 is formed to protrude outward and the portion having a larger radius of each thereof faces upward by a rotation of the eccentric cam 21, the height of the piston 13 is increased relative to that of the connecting rod 12 such that the compression ratio is increased during compression.

Referring to FIGS. 7 through 9, latch grooves 23a and 24a are respectively formed at the low-pressure outer plate 23 and the high-pressure outer plate 24 to fix relative positions of the low-pressure outer plate 23 and the high-pressure outer plate 24 to the connecting rod 12. However, the latch grooves 23a and 24a are formed at different positions of the low-pressure outer plate 23 and the high-pressure outer plate 24. That is, the latch groove 24a formed at the high-pressure outer plate 24 is formed at a position at which the low-pressure outer plate 23 and the high-pressure outer plate 24 are fixed to the connecting rod 12 at which positions where the portion having a larger radius of each of the low-pressure outer plate 23 and the high-pressure outer plate 24 is higher than the eccentric cam 21, and the latch groove 23a formed at the low-pressure outer plate 23 is formed at a position at which the portion having a larger radius of each of the low-pressure outer plate 23 and the high-pressure outer plate 24 is not higher than the eccentric cam 21.

Referring back to FIG. 2, a latch pin 25 is installed at the connecting rod 12 to be slidable in an axial direction of the crankshaft 11. The latch pin 25 is formed to have a length corresponding to a thickness of the connecting rod 12. In a state in which the latch pin 25 is inserted into the connecting rod 12, the latch pin 25 is moved to either the low-pressure outer plate 23 or the high-pressure outer plate 24 according to an inflow of oil, and a relative position of either the low-pressure outer plate 23 or the high-pressure outer plate 24 is fixed to the connecting rod 12 such that the varied compression ratio is maintained. That is, when the latch pin 25 is latched across the low-pressure outer plate 23 and the connecting rod 12, the low-pressure outer plate 23 is not rotated relative to the connecting rod 12 such that the state of the low compression ratio is maintained, and when the latch pin 25 is latched across the high-pressure outer plate 24 and the connecting rod 12, the state of the high compression ratio is maintained.

In order to allow the latch pin 25 to be located inside the connecting rod 12, an inlet hole 24aa for moving the latch pin 25 from the low-pressure outer plate 23 and the high-pressure outer plate 24 to the connecting rod 12, and a discharge hole 24ab for discharging the oil filled in the latch grooves 23a and 24a are formed at the latch grooves 23a and 24a. The inlet hole 24aa and the discharge hole 24ab are connected to the latch grooves 23a and 24a to supply the pressurized oil to the latch grooves 23a and 24a or discharge the oil from the latch grooves 23a and 24a.

Figure 4:
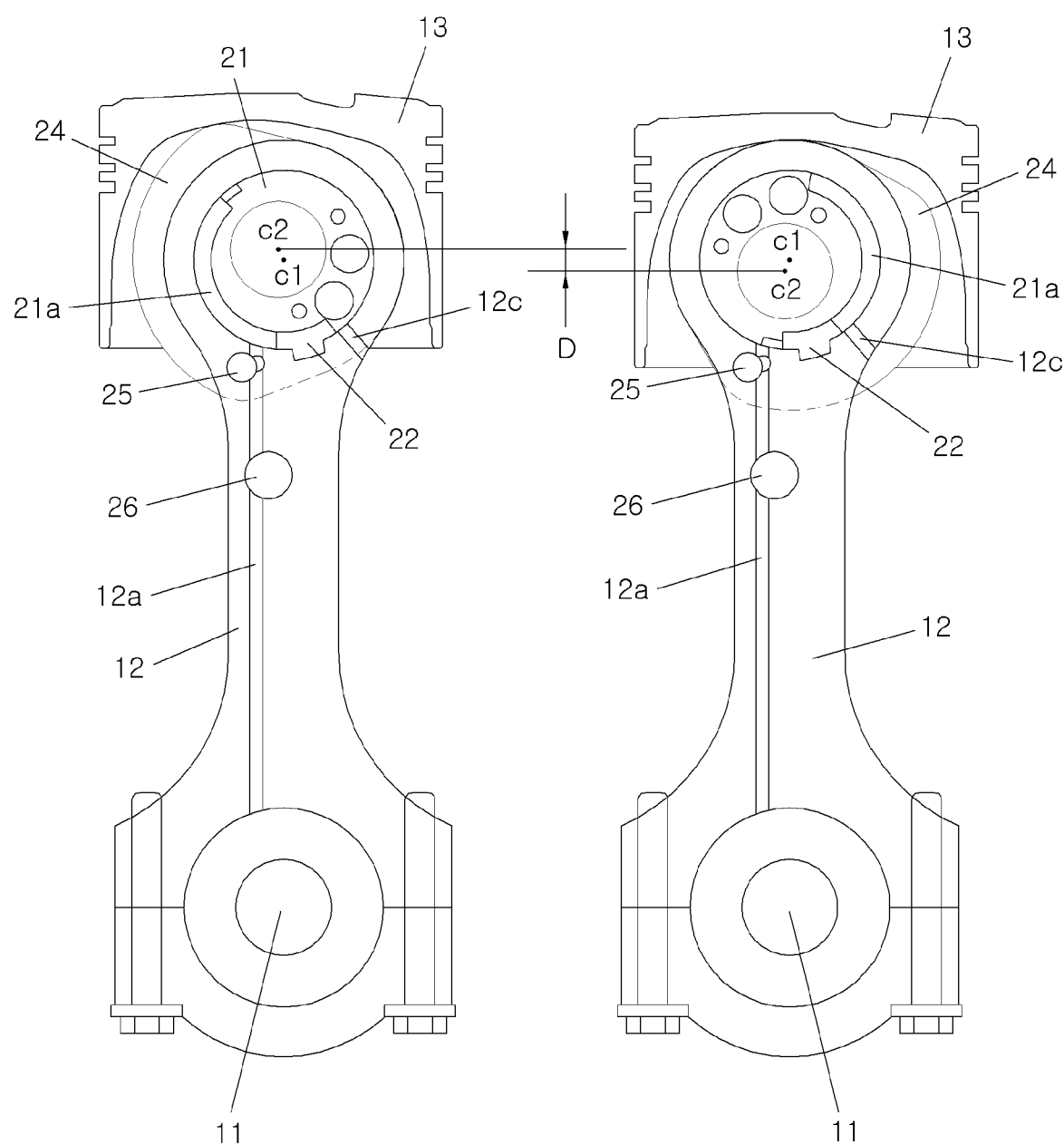
FIG. 4 is a front view illustrating comparison between states of a high compression ratio and a low compression ratio in the variable compression ratio device according to the exemplary form of the present disclosure.
Figure 10:
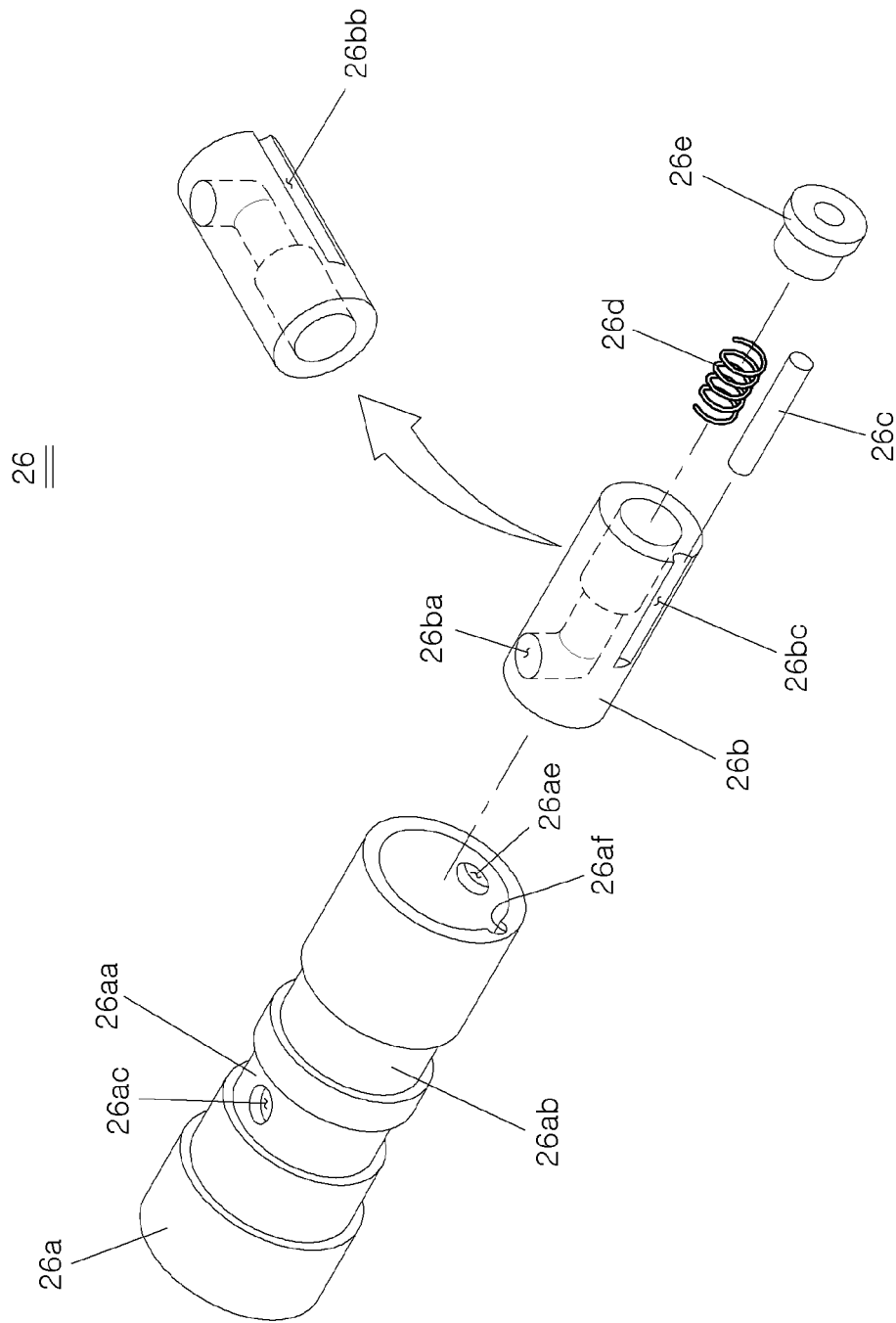
FIG. 10 is an exploded perspective view illustrating a spool valve in the variable compression ratio device according to the exemplary form of the present disclosure.
Figure 11:
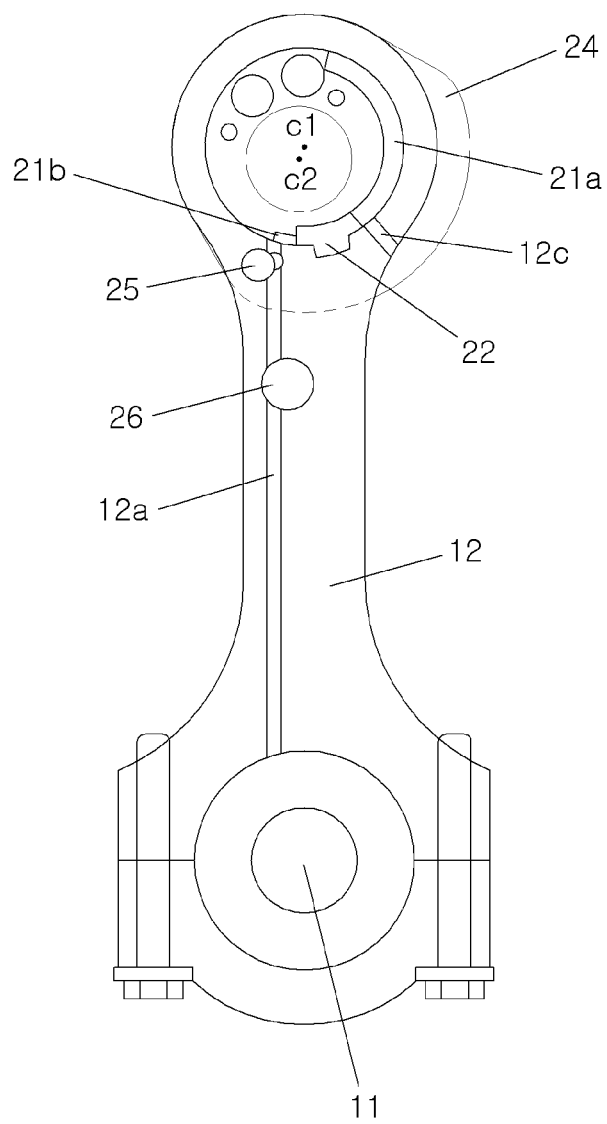
Figure 12:
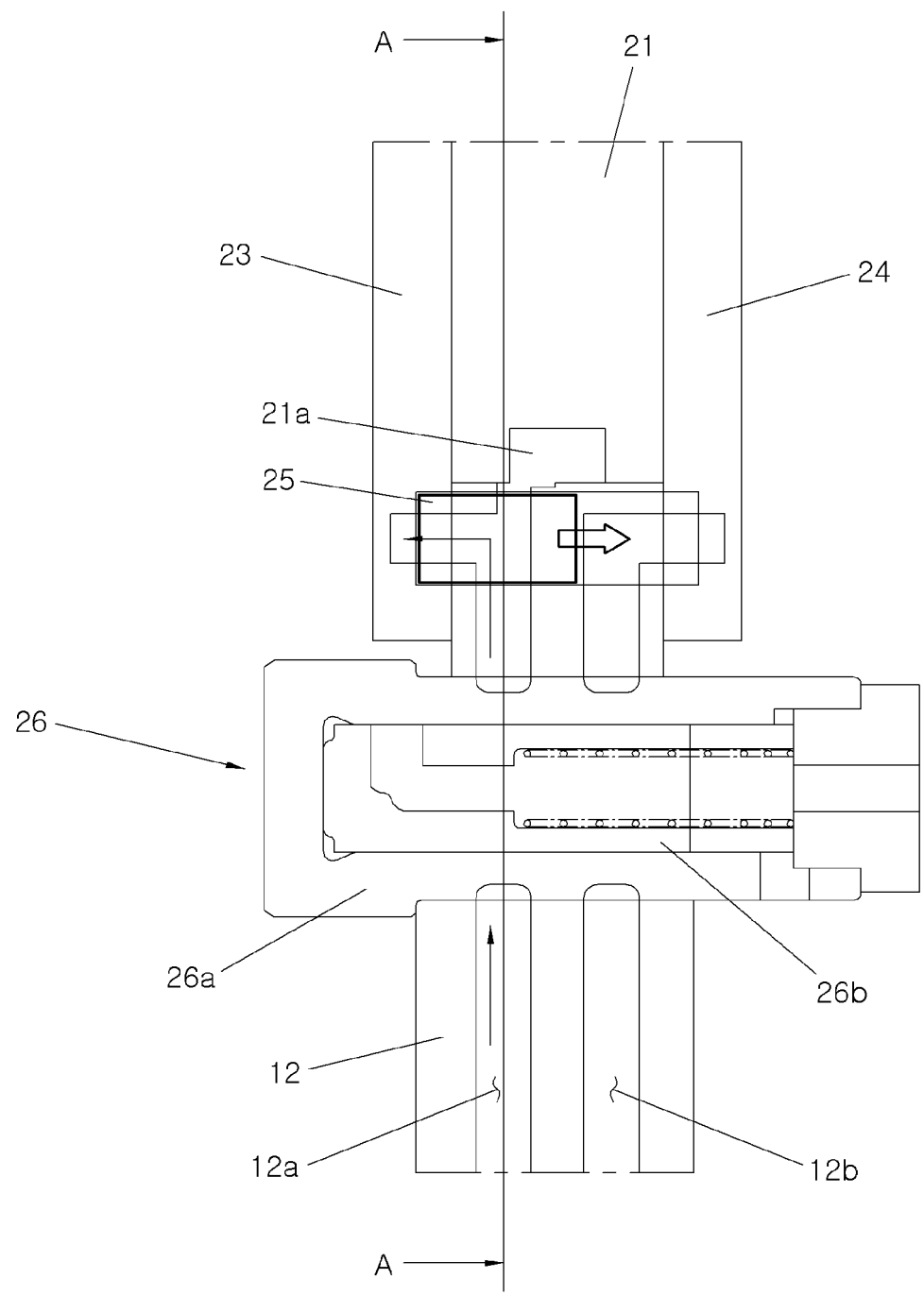
Figure 13:
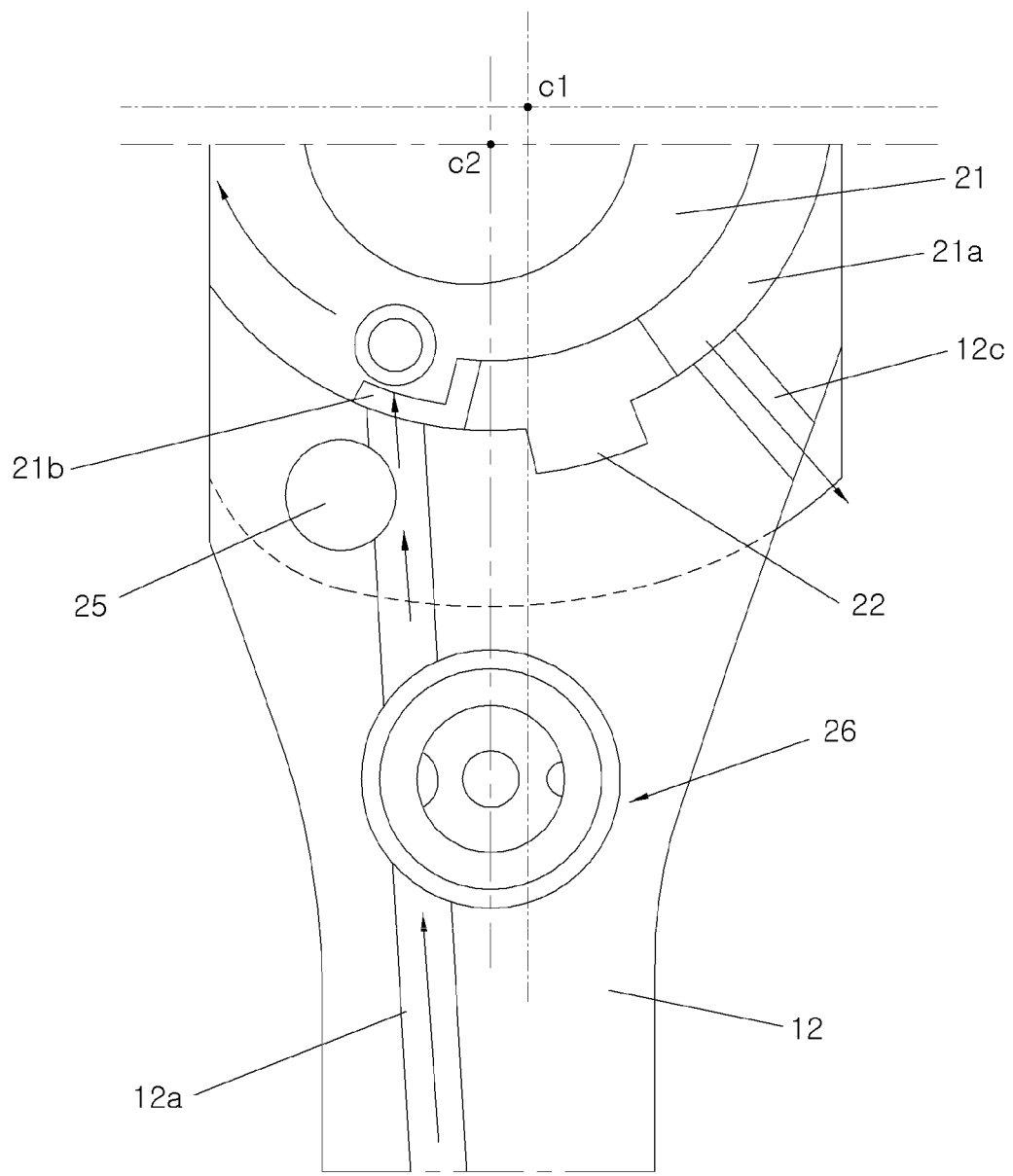
Figure 14:
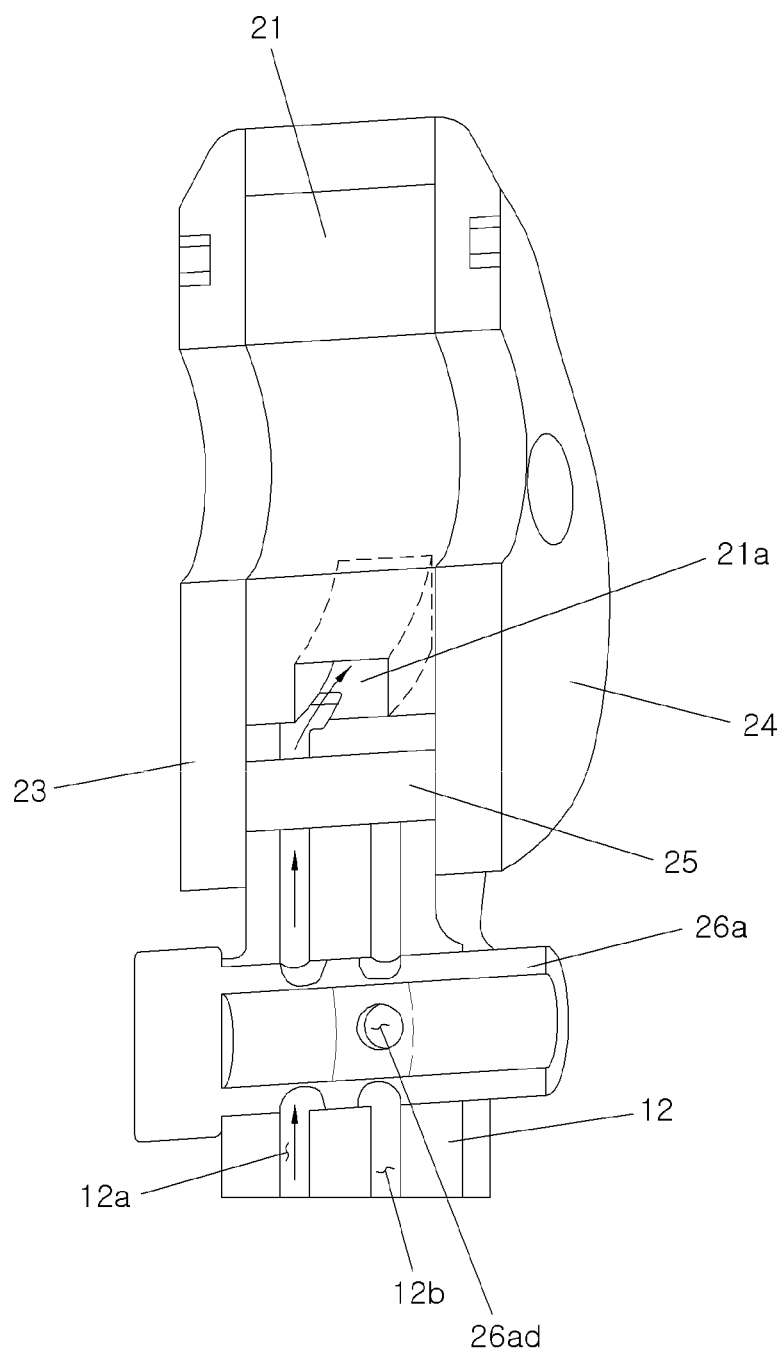
Figure 15:
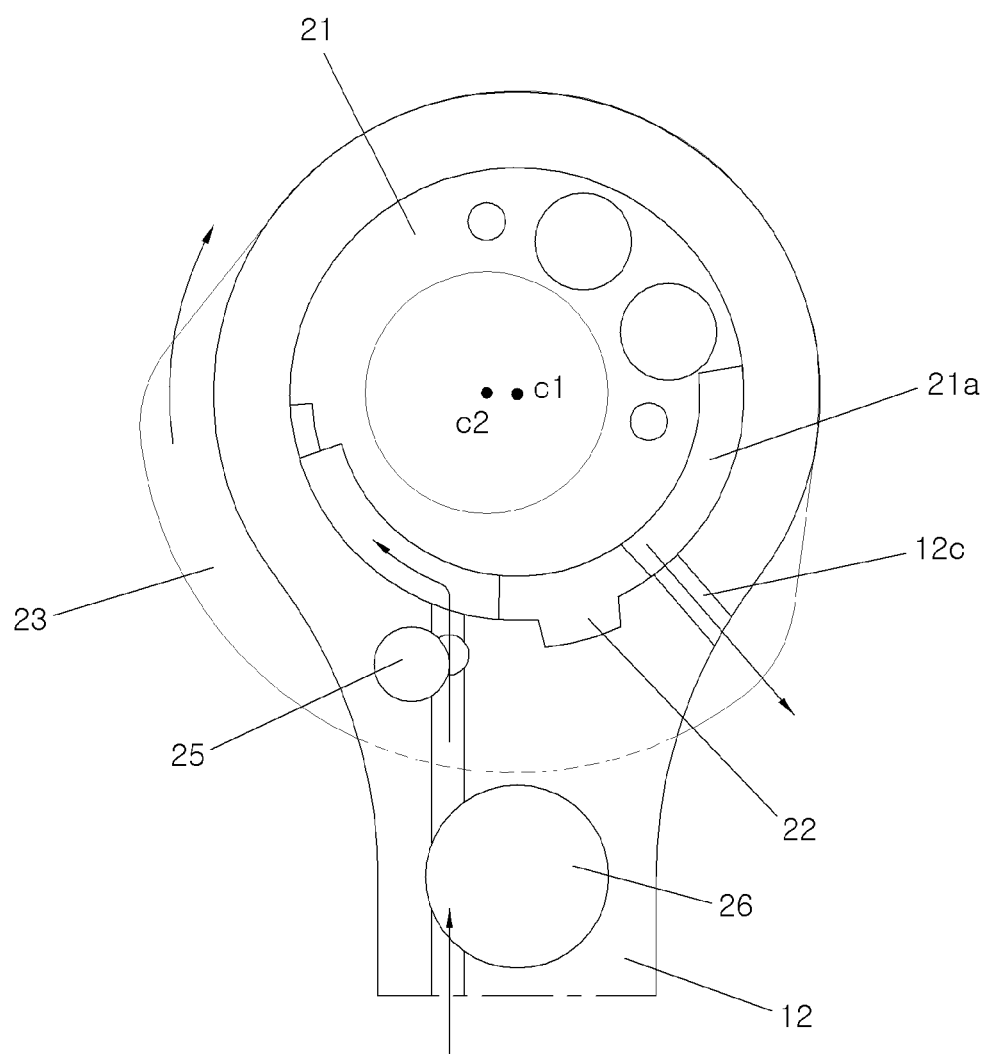
Figure 16:
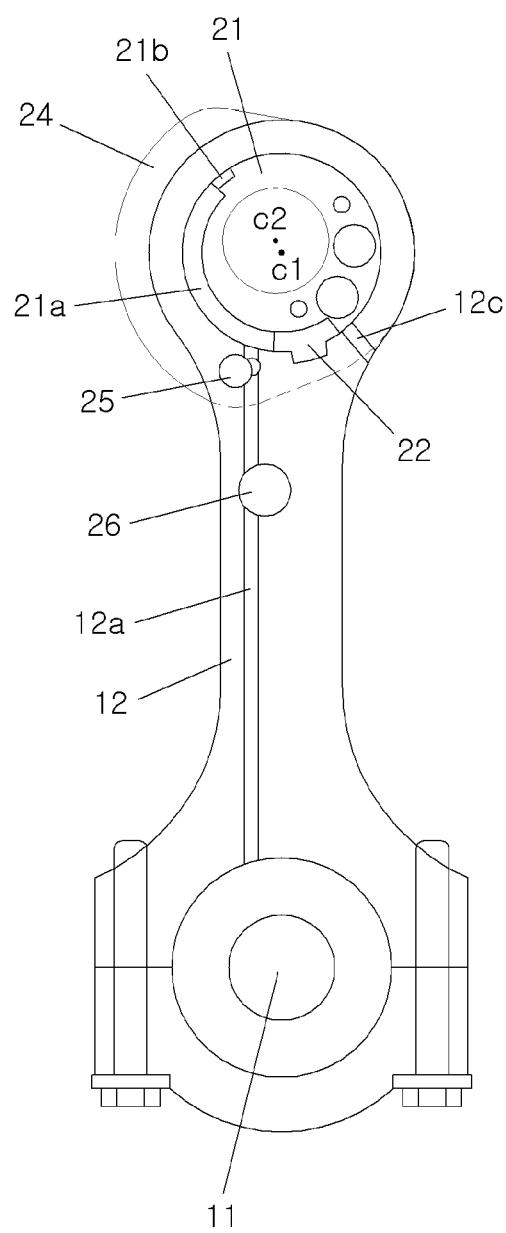
Figure 17:
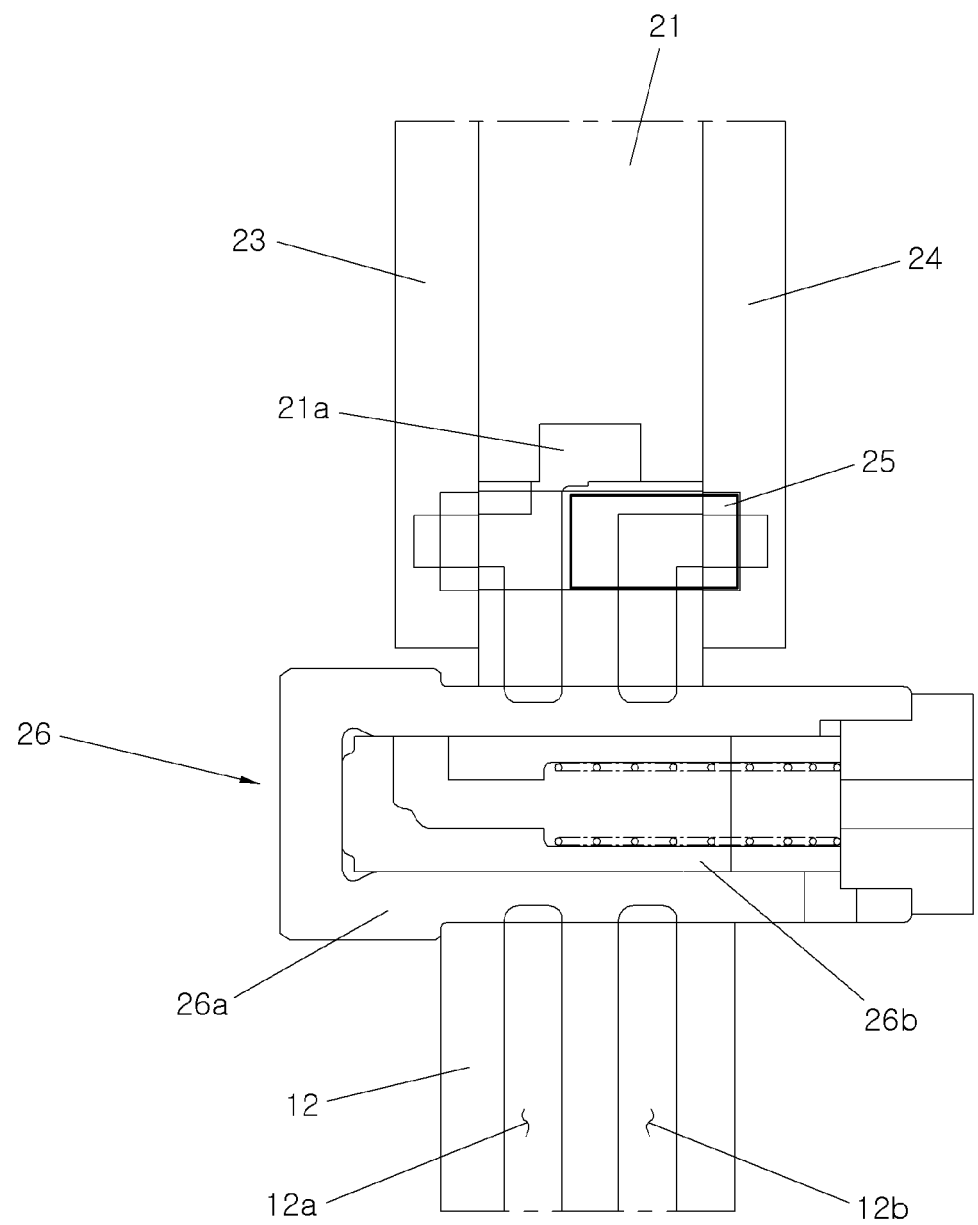

Referring to FIGS. 4 and 10, when the high compression ratio is switched to the low compression ratio, a spool valve 26 serves to discharge the oil filling in the eccentric cam 21. The spool valve 26 includes a valve body 26a engaged with the connecting rod 12, a plunger 26b slidably installed in the valve body 26a and configured to discharge oil to the outside, a rotation prevention pin 26c for inhibiting or preventing a relative rotation of the valve body 26a to the plunger 26b, a spring 26d for elastically supporting the plunger 26b inward the valve body 26a, and a cap 26e engaged with an end portion of the valve body 26a.

In FIG. 10, the valve body 26a is formed in a cylindrical shape with one closed end. The other end of the valve body 26a is formed to be opened for engagement of the plunger 26b. The valve body 26a is engaged with the connecting rod 12 to be located on the first oil line 12a and the second oil line 12b of the connecting rod 12. The first oil line 12a and the second oil line 12b are formed to pass through a circumference of the spool valve 26, and a first groove 26aa and a second groove 26ab are formed with predetermined depths in a circumferential direction of the valve body 26a at an outer side of the valve body 26a at a position at which the first oil line 12a and the second oil line 12b pass through. The first groove 26aa and the second groove 26ab are respectively connected to the first oil line 12a and the second oil line 12b. Accordingly, the oil supplied to the first oil line 12a is supplied to the first oil line 12a through the first groove 26aa at the valve body 26a. This is also similarly applied to the second groove 26ab.

An oil discharge hole 26ac and a pressure release hole 26ad (see FIG. 14) are respectively formed at the first groove 26aa and the second groove 26ab to pass through the valve body 26a. The oil discharge hole 26ac serves to discharge the oil of the eccentric cam 21 to the plunger 26b, and the pressure release hole 26ad serves to move the plunger 26b by the oil of the second oil line 12b.

A valve discharge hole 26ae is formed at a position adjacent to the other end of the valve body 26a to discharge the oil in the valve body 26a.

As shown in FIG. 10, the plunger 26b is slidably inserted into the valve body 26a. An oil discharge passage 26ba is formed at the plunger 26b to allow the oil to be discharged from the oil chamber 21a to the outside. The oil discharge passage 26ba is formed to pass through a side surface of the plunger 26b in a length direction of the plunger 26b. An inlet of the oil discharge passage 26ba is formed at the side surface of the plunger 26b, and when the plunger 26b slides, the inlet communicates with the oil discharge hole 26ac. An outlet of the oil discharge passage 26ba is formed at one end of the plunger 26b.

The rotation prevention pin 26c is inserted between an inner surface of the valve body 26a and an outer surface of the plunger 26b to inhibit a relative rotation of the valve body 26a to the plunger 26b. In a state in which the plunger 26b is inserted into the valve body 26a, the rotation prevention pin 26c is inserted into a rotation prevention groove 26af formed at the inner surface of the valve body 26a and a rotation prevention groove 26bc formed at the plunger 26b, thereby inhibiting the relative rotation of the valve body 26a to the plunger 26b.

The cap 26e is inserted into the opened end of the valve body 26a to inhibit or prevent release of the valve body 26a. A through-hole is formed at the cap 26e to discharge the oil in the plunger 26b to the outside.

The spring 26d is disposed between the plunger 26b and the cap 26e inside the valve body 26a to elastically support the plunger 26b inward the valve body 26a.

The oil control valve 31 is operated by an electronic control unit (ECU) to operate to supply the oil to either the first oil line 12a or the second oil line 12b when the compression ratio is switched. When a low compression ratio is switched to the high compression ratio, the oil control valve 31 supplies the pressurized oil to the first oil line 12a, and otherwise, the oil control valve 31 supplies the pressurized oil to the second oil line 12b.

The variable compression ratio device according to the form of the present disclosure, which has the above-described configuration, will be described below.

FIGS. 11 to 17 are diagrams illustrating a state in which the variable compression ratio device operates in a case in which a low compression ratio is switched to a high compression ratio.

In an engine operation with a low compression ratio, the latch pin 25 is inserted into the latch groove 23a of the low-pressure outer plate 23 such that the protruding portions of the low-pressure outer plate 23 and the high-pressure outer plate 24 are in a downward state. The center c2 of the piston pin 14 is located lower than the center c1 of the small end portion of the connecting rod 12 (see a right side of FIG. 4 and FIG. 11) and the piston 13 is located to be lower such that a compression ratio of each of the cylinder and thus the engine operates with the low compression ratio.

When the controller, e.g., the ECU of the vehicle intends to increase the compression ratio of the engine, the ECU operates the oil control valve 31 to supply the pressurized oil to the first oil line 12a. When the pressurized oil is supplied to the first oil line 12a, the pressurized oil passes through the spool valve 26 through the first groove 26aa of the spool valve 26.

The pressurized oil passing through the spool valve 26 is supplied to the latch groove 23a of the low-pressure outer plate 23 and the oil chamber 21a. Even though the pressurized oil is supplied to the oil chamber 21a in an initial stage, the latch pin 25 is inserted into the latch groove 23a of the low-pressure outer plate 23 such that that the eccentric cam 21 is not rotated. When the pressurized oil is supplied to the latch groove 23a of the low-pressure outer plate 23, the latch pin 25 starts to be released while the pressurized oil fills the latch groove 23a (see FIG. 12). When the pressurized oil completely fills in the latch groove 23a, the latch pin 25 is released from the latch groove 23a of the low-pressure outer plate 23.

Thereafter, when the latch pin 25 is completely released from the latch groove 23a of the low-pressure outer plate 23, the low-pressure outer plate 23 is unlocked by the latch pin 25 such that an assembly of the low-pressure outer plate 23, the eccentric cam 21, and the high-pressure outer plate 24 is rotatable. When the pressurized oil is supplied through the first oil line 12a, the pressurized oil starts to flow into the auxiliary chamber 21b (see FIG. 13). When the pressurized oil starts to flow into the auxiliary chamber 21b, the eccentric cam 21 starts to be rotated due to a hydraulic pressure from the auxiliary chamber 21b. Then, the pressurized oil also fills the oil chamber 21a communicating with the auxiliary chamber 21b, and thus the eccentric cam 21 is rotated (see FIGS. 14 and 15). While the eccentric cam 21 is rotated, the oil chamber 21a is separated by the separation wall 22, the pressurized oil and air filling the oil chamber 21a behind the separation wall 22 (a right side in FIG. 15) are discharged through the drain line 12c such that the eccentric cam 21 may be smoothly rotated.

When the eccentric cam 21 becomes in a state of being fully rotated (see FIG. 16) and the pressurized oil is continuously supplied to the latch groove 23a of the low-pressure outer plate 23, the latch pin 25 is inserted into the latch groove 24a of the high-pressure outer plate 24.

When the latch pin 25 is completely inserted into the latch groove 24a of the high-pressure outer plate 24 (see FIG. 17), the assembly of the low-pressure outer plate 23, the eccentric cam 21, and the high-pressure outer plate 24 becomes in a state in which a rotation of the assembly is impossible, and the protruding portions of the low-pressure outer plate 23 and the high-pressure outer plate 24 become in an upward state.

As described above, when the protruding portions of the low-pressure outer plate 23 and the high-pressure outer plate 24 become in the upward state, the center c2 of the piston pin 14 is located to be higher than the center c1 of the small end portion of the connecting rod 12 (see a left side of FIG. 4) such that the engine may operate with a high compression ratio.

FIGS. 18 to 22 are diagrams illustrating a state in which the variable compression ratio device operates in a case in which the high compression ratio is switched to the low compression ratio.

In order to switch a state of the engine from the high compression ratio to the low compression ratio, the ECU allows the pressurized oil to be supplied to the second oil line 12b through the oil control valve 31.

When the pressurized oil is supplied to the second oil line 12b, the pressurized oil releases the latch pin 25 from the high-pressure outer plate 24 such that the low-pressure outer plate 23, the eccentric cam 21, and the high-pressure outer plate 24 become in a rotatable state. Some portion of the pressurized oil flows into the latch groove 24a of the high-pressure outer plate 24 by passing through the spool valve 26 such that the latch pin 25 is moved from the high-pressure outer plate 24 to an interior of the eccentric cam 21. The pressurized oil supplied to the second oil line 12b flows into the latch groove 24a of the high-pressure outer plate 24 through the inlet hole 24aa such that the latch pin 25 is released from the latch groove 24a to be moved to the interior of the eccentric cam 21. The latch pin 25 is released from the high-pressure outer plate 24. Accordingly, the latch pin 25 is not connected to either the low-pressure outer plate 23 or the high-pressure outer plate 24 such that the eccentric cam 21 becomes in a freely rotatable state.

Figure 18:
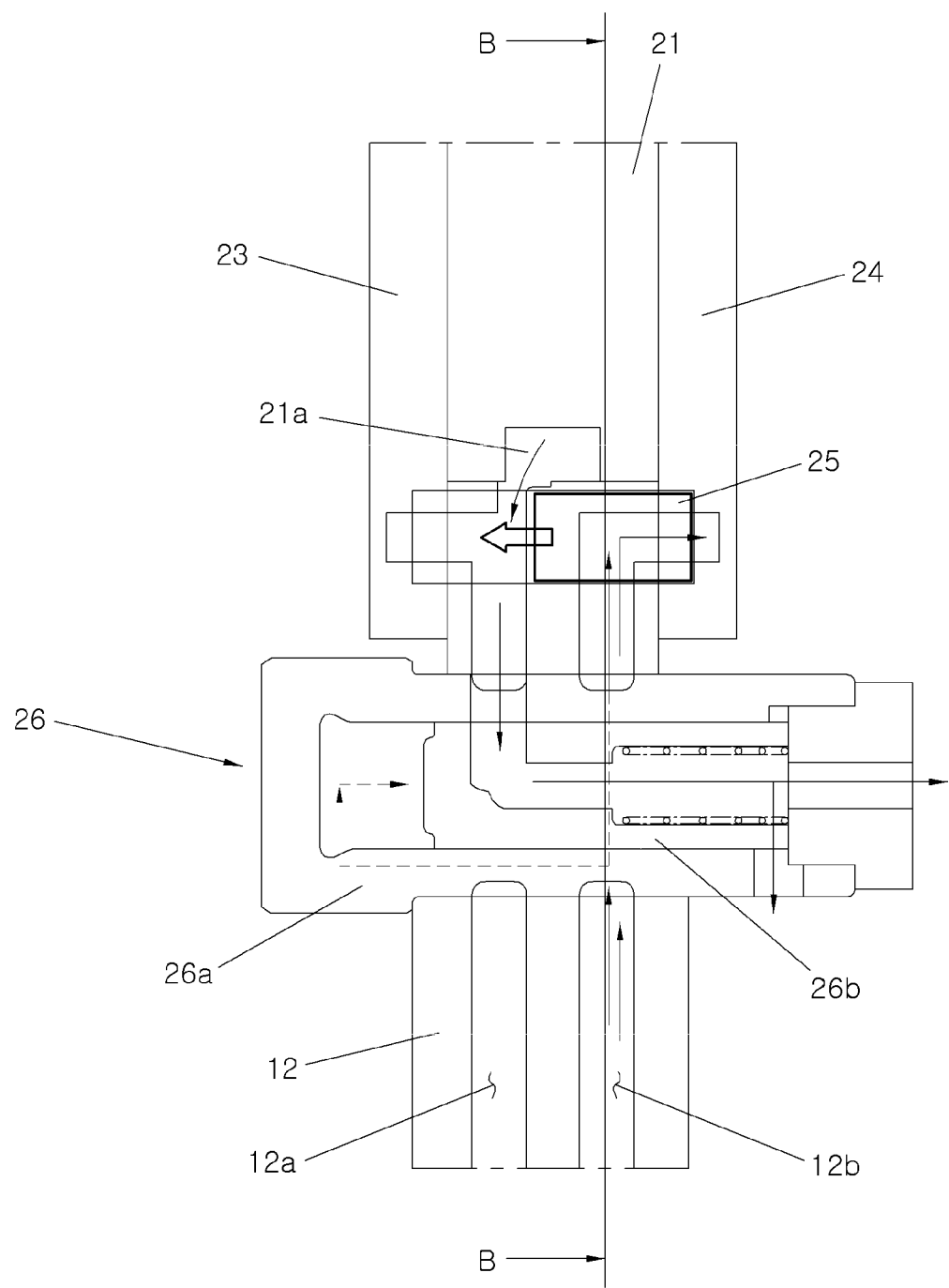
Figure 19:
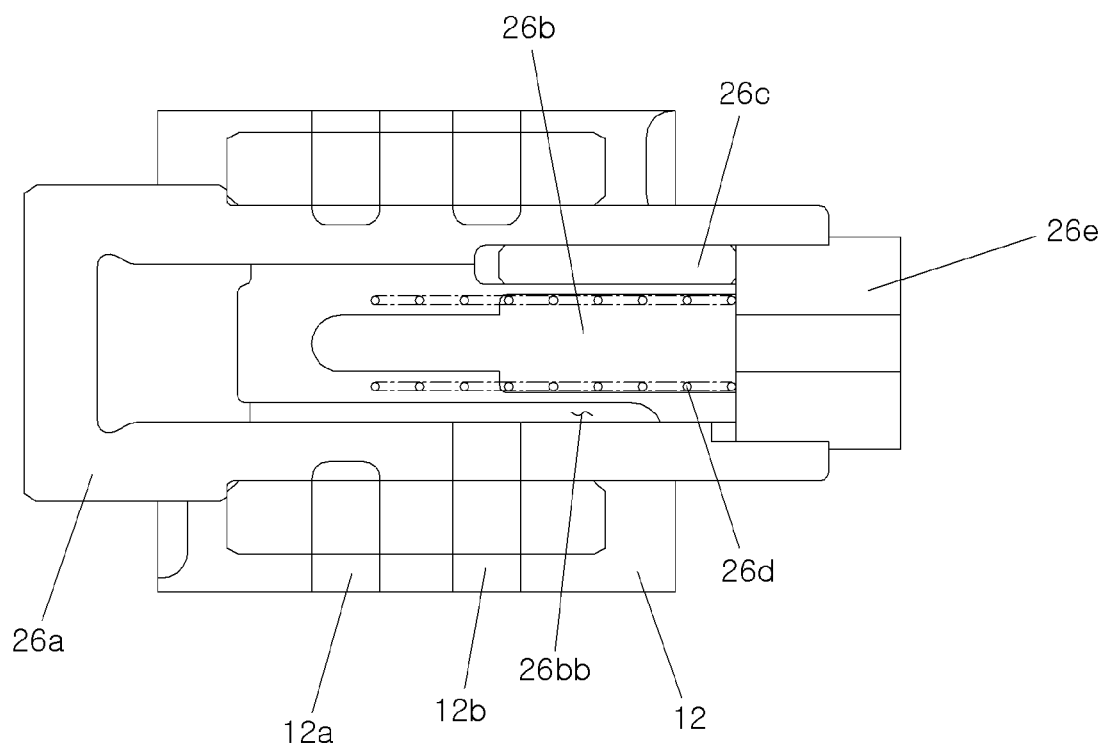
Figure 20:
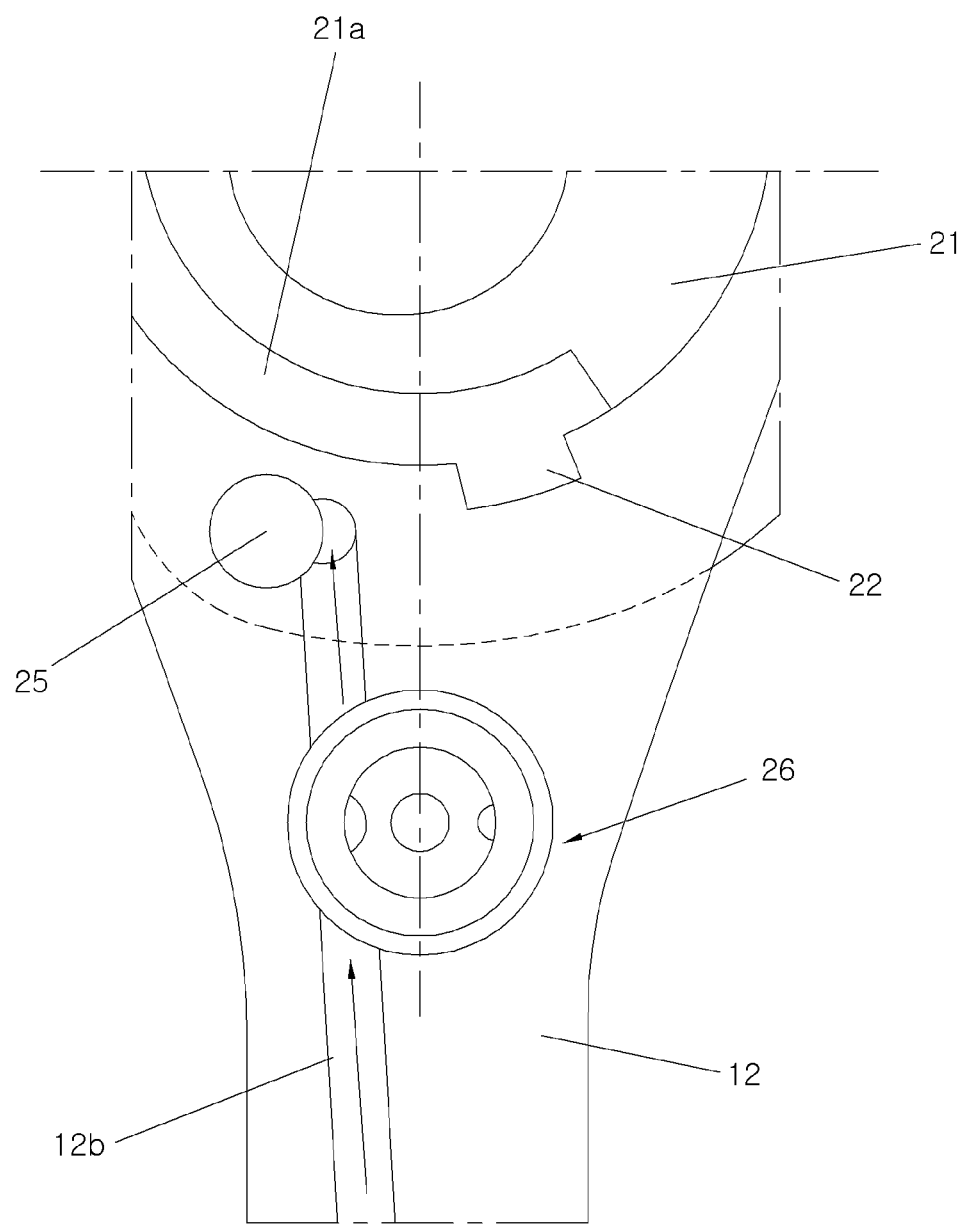
Figure 21:
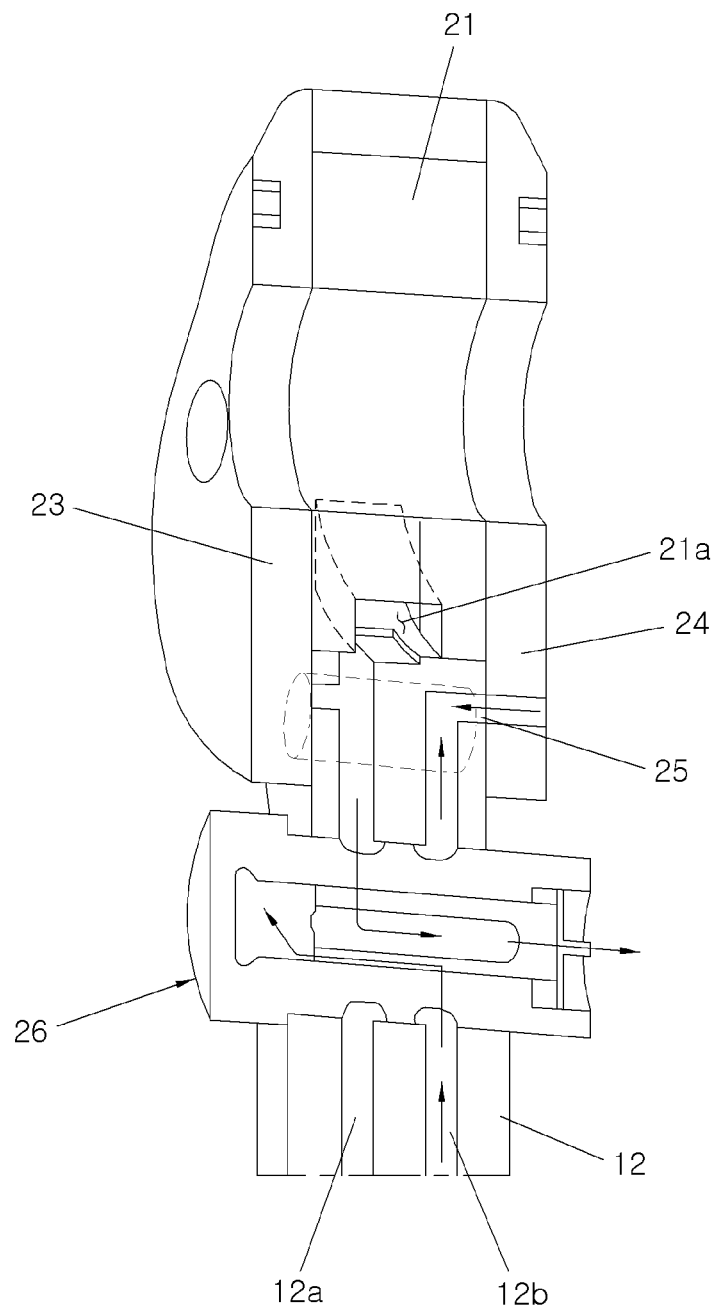

Simultaneously, some portion of the pressurized oil flowing into the second oil line 12b moves the plunger 26b from the spool valve 26. The pressurized oil supplied to the second oil line 12b is supplied between the inner surface of the valve body 26a and the outer surface of the plunger 26b through the pressure release hole 26a d and then flows into a space between the valve body 26a and the plunger 26b through a pressure release groove 26bb (see FIG. 19). In other words, the pressurized oil supplied to the second oil line 12b moves along the pressure release groove 26bb, and when the pressurized oil fills the space between the valve body 26a and the plunger 26b, the plunger 26b is moved inside the valve body 26a due to a pressure of the pressurized oil. As shown in FIGS. 18 and 19, when the plunger 26b is moved and thus the inlet of the oil discharge passage 26ba communicates with the oil discharge hole 26ac of the valve body 26a, the pressurized oil filling in the oil chamber 21a of the eccentric cam 21 is discharged through the spool valve 26. When the oil discharge hole 26ac communicates with the oil discharge passage 26ba, the pressurized oil moves from the oil chamber 21a to the spool valve 26 through the first oil line 12a. Since the oil discharge hole 26ac and the oil discharge passage 26ba communicate with each other, in the spool valve 26, the pressurized oil passes through the valve body 26a via the oil discharge hole 26ac and then flows into the plunger 26b through the oil discharge passage 26ba. The pressurized oil flowing into the plunger 26b is drained to the outside through the valve discharge hole 26ae or the cap 26e.

Meanwhile, the pressurized oil supplied to the second oil line 12b flows into the latch groove 24a through the inlet hole 24aa of the high-pressure outer plate 24. The pressurized oil is supplied to the latch groove 24a. When the pressurized oil fills in the latch groove 24a, the latch pin 25 is released from the latch groove 24a to be moved to the connecting rod 12 such that the eccentric cam 21 becomes in a rotatable state.

Figure 22:
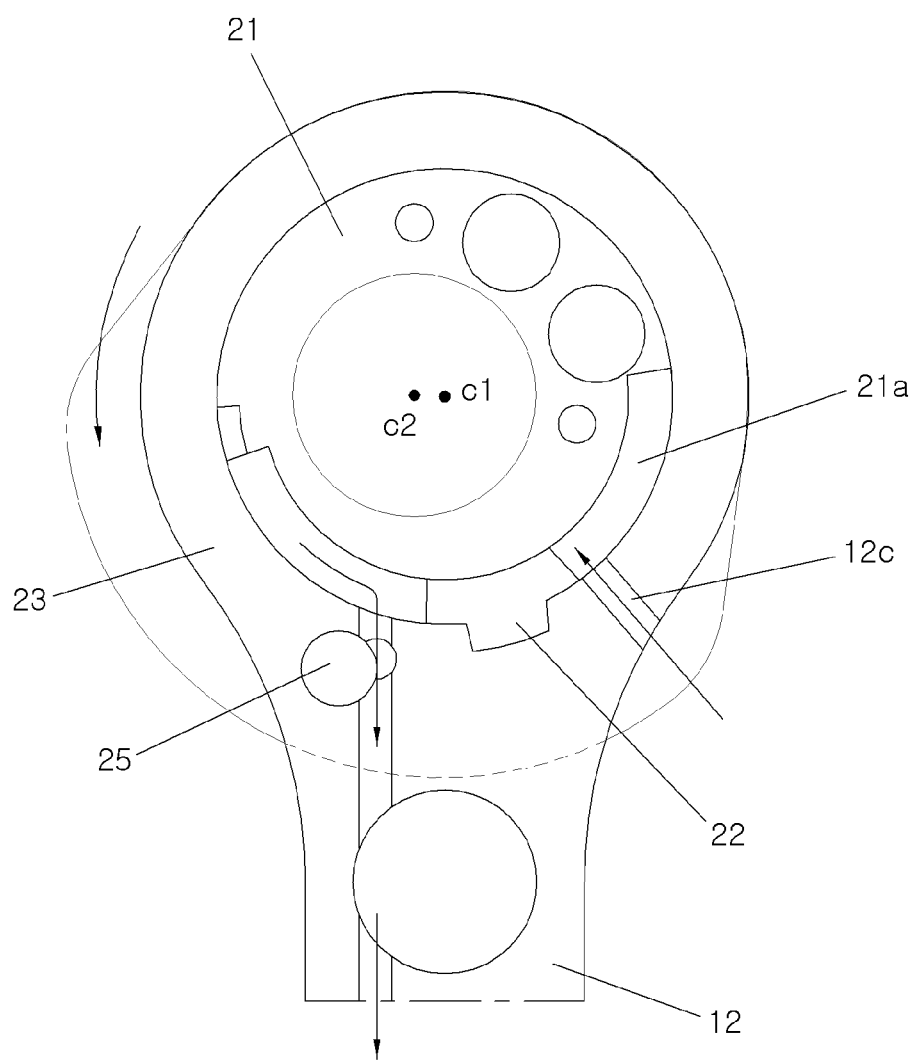

In the rotatable state, air is introduced into the oil chamber 21a through the drain line 12c and the eccentric cam 21 is rotated in a direction opposite to a direction when the low compression ratio is switched to the high compression ratio (in a counterclockwise direction in FIG. 22). That is, external air is introduced into a space provided at a right side of the separation wall 22 in the oil chamber 21a such that the eccentric cam 21 is rotated to a side at which the portion having a larger radius of each of the low-pressure outer plate 23 and the high-pressure outer plate 24 faces downward. When a pressure is applied to the piston 13, the eccentric cam 21 is rotated in the counterclockwise direction (on the basis of FIG. 22) such that there is no need to supply the oil pressurizing the eccentric cam 21 to the oil chamber 21a. When the state of the high compression ratio is switched to the state of the low compression ratio, the portion having a larger radius of each of the low-pressure outer plate 23 and the high-pressure outer plate 24 is rotated in a downward direction by a pressure applied to the piston 13 without a supply of the pressurized oil such that the eccentric cam 21 is rotated in the counterclockwise direction. As described above, the eccentric cam 21 is rotated such that the center c1 of the small end portion of the connecting rod 12 is located to be higher than the center c2 of the piston pin 14.

At this point, the oil in the left space of the oil chamber 21a is drained through the first oil line 12a and the spool valve 26 as described above.

Meanwhile, when the eccentric cam 21 is rotated by a predetermined angle, the latch pin 25 is inserted into the low-pressure outer plate 23 again. When the oil is continuously supplied to the latch groove 24a of the high-pressure outer plate 24, the latch pin 25 tends to be moved from the high-pressure outer plate 24 to the low-pressure outer plate 23. Before the latch pin 25 coincides with the latch groove 23a of the low-pressure outer plate 23, the latch pin 25 is not engaged with the low-pressure outer plate 23 such that the eccentric cam 21, the low-pressure outer plate 23, and the high-pressure outer plate 24 are rotated in the counterclockwise direction (on the basis of FIG. 22). When the eccentric cam 21, the low-pressure outer plate 23, and the high-pressure outer plate 24 are continuously rotated and thus the latch pin 25 coincides with the latch groove 23a of the low-pressure outer plate 23, the latch pin 25 is partially inserted into the latch groove 23a of the low-pressure outer plate 23 such that the rotations of the eccentric cam 21, the low-pressure outer plate 23, and the high-pressure outer plate 24 are stopped.

At this point, the portion having a larger radius of each of the low-pressure outer plate 23 and the high-pressure outer plate 24 is fully descended resulting in the state of the low compression ratio. That is, the center c1 of the small end portion of the connecting rod 12 is located to be higher than the center c2 of the piston pin 14 (see the right side of FIG. 4) such that the engine may operate with the low compression ratio.

The ECU supplies oil to either the first oil line 12a or the second oil line 12b through the oil control valve 31 according to a load state of the engine such that an operation of the engine can be controlled by setting the compression ratio of each cylinder to the low compression ratio or the high compression ratio.

According to the variable compression ratio device of the present disclosure, which has the above-described configuration, a compression ratio can be easily varied by varying a position of a piston at a small end portion of a connecting rod using a hydraulic pressure.

Further, in a state in which the compression ratio is varied, a rotation of an outer plate is confined by a latch pin. Accordingly, we have discovered that oil may not be compressed and thus the compression ratio may not be varied.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A variable compression ratio device, comprising:
    a connecting rod having a large end portion link-connected to a crankshaft and a small end portion link-connected to a piston by a piston pin;
    an eccentric cam rotatably installed at the small end portion of the connecting rod and at which the piston pin eccentrically passes through a rotation center; and
    an low-pressure outer plate and an high-pressure outer plate engaged with both side surfaces of the eccentric cam, formed to partially protrude outward, and selectively engaged with the connecting rod according to a compression ratio,
    wherein the low-pressure outer plate and the high-pressure outer plate are selectively engaged with the connecting rod by a controller according to a supply direction of a hydraulic pressure.

2. The variable compression ratio device of claim 1, wherein the low-pressure outer plate and the high-pressure outer plate are formed to partially protrude outward at the same phase.

3. The variable compression ratio device of claim 2, wherein:
    when the compression ratio is a low compression ratio, the low-pressure outer plate is engaged with the connecting rod to direct the protruding portion to face downward; and
    when the compression ratio is a high compression ratio, the high-pressure outer plate is engaged with the connecting rod to direct the protruding portion to face upward.

4. The variable compression ratio device of claim 1, wherein a first oil line to which oil is supplied when the low-pressure outer plate and the connecting rod are engaged, and a second oil line to which the oil is supplied when the high-pressure outer plate and the connecting rod are engaged are formed at the connecting rod.

5. The variable compression ratio device of claim 4, wherein a latch pin is installed at the connecting rod to be slidable in a direction perpendicular to the connecting rod, and
    when the oil is supplied to the first oil line so as to switch a high compression ratio to a low compression ratio in a cylinder, the eccentric cam is engaged with the high-pressure outer plate by the latch pin, and when the oil is supplied to the second oil line so as to switch the low compression ratio to the high compression ratio in the cylinder, the eccentric cam is engaged with the low-pressure outer plate by the latch pin.

6. The variable compression ratio device of claim 5, wherein
    a first latch groove is formed at the low-pressure outer plate to accommodate the latch pin, and
    when the oil supplied from the first oil line fills in the first latch groove, the latch pin is moved from the first latch groove to the connecting rod such that a state of the low compression ratio is released.

7. The variable compression ratio device of claim 6, wherein an inlet hole through which the oil supplied from the first oil line flows into the first latch groove, and a discharge hole through which the oil is discharged from the first latch groove are formed at the first latch groove.

8. The variable compression ratio device of claim 5, wherein
    a second latch groove is formed at the high-pressure outer plate to accommodate the latch pin, and
    when the oil supplied from the second oil line fills in the second latch groove, the latch pin is moved from the second latch groove to the connecting rod such that a state of the high compression ratio is released.

9. The variable compression ratio device of claim 8, wherein an inlet hole through which the oil supplied from the second oil line flows into the second latch groove, and a discharge hole through which the oil is discharged from the second latch groove are formed at the second latch groove.

10. The variable compression ratio device of claim 4, wherein
    an oil chamber is formed at a circumference of the eccentric cam to accommodate the oil supplied from the first oil line, and
    when the oil is supplied from the first oil line to the oil chamber, the eccentric cam is rotated to switch a state of a low compression ratio to a state of a high compression ratio.

11. The variable compression ratio device of claim 10, wherein a separation wall is formed at the connecting rod to separate the oil chamber into two spaces.

12. The variable compression ratio device of claim 11, wherein an auxiliary chamber communicating with the oil chamber is formed at a front end of the oil chamber to allow a rotation of the eccentric cam to start when the oil is supplied from the first oil line.

13. The variable compression ratio device of claim 12, wherein a drain line is formed at the connecting rod to communicate a side, at which the auxiliary chamber is not formed, with the outside about the separation wall at the oil chamber.

14. The variable compression ratio device of claim 10, wherein the connecting rod includes a spool valve configured to discharge the oil filled in the oil chamber to the outside when the state of the high compression ratio is switched to the state of the low compression ratio.

15. The variable compression ratio device of claim 14, wherein the spool valve includes:
- a valve body formed in a cylindrical shape with one closed end and fixed to the connecting rod; and
- a plunger slidably installed inside the valve body and configured to communicate the first oil line with the outside while sliding when the state of the high compression ratio is switched to the state of the low compression ratio.

16. The variable compression ratio device of claim 15, wherein
- the first oil line and the second oil line are formed to pass through a circumference of the spool valve, and
- a first groove and a second groove are formed with a predetermined depth at positions at which the first oil line and the second oil line pass through a circumference of the valve body.

17. The variable compression ratio device of claim 16, wherein
- a pressure release hole through which the oil supplied to the second oil line flows into the valve body is formed at the second groove, and
- a pressure release groove communicating with the pressure release hole and having a predetermined depth toward the closed end of the valve body is formed at an outer side of the plunger to slide the plunger by supplying the oil to the closed end of the valve body.

18. The variable compression ratio device of claim 16, wherein
- an oil discharge hole is formed at the first groove to allow the oil filled in the first oil line to flow into the valve body,
- an oil discharge passage is formed at the plunger in a length direction of the plunger and has one end configured to allow the plunger to slide and communicate with the oil discharge hole and the other end through which the oil flowing into the oil discharge hole is discharged, and
- a valve discharge hole is formed at a position adjacent to the other end of the valve body and discharges the oil flowing into the oil discharge hole to the outside of the spool valve.

19. The variable compression ratio device of claim 15, wherein
- a cap configured to block an end portion of the valve body is engaged with an opened end portion of the valve body, and
- an elastic member configured to elastically support the plunger inward the valve body is installed between the cap and the plunger.

20. The variable compression ratio device of claim 19, wherein a through-hole is formed at the cap to discharge the oil inside the plunger to the outside.

* * * * *